(12) United States Patent
DeDecker et al.

(10) Patent No.: US 9,611,364 B2
(45) Date of Patent: Apr. 4, 2017

(54) METHOD OF MAKING ALKOXYSILANE STABILIZED POLYMERS, AND POLYMER COMPOSITIONS

(71) Applicant: Firestone Polymers, LLC, Akron, OH (US)

(72) Inventors: Mark N. DeDecker, North Canton, OH (US); James H. Pawlow, Schwenksville, PA (US); Joseph P. Padolewski, Copley, OH (US); Kenji Nakatani, Tokyo (JP)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 14/405,576

(22) PCT Filed: Jun. 6, 2013

(86) PCT No.: PCT/US2013/044408
§ 371 (c)(1),
(2) Date: Dec. 4, 2014

(87) PCT Pub. No.: WO2013/184861
PCT Pub. Date: Dec. 12, 2013

(65) Prior Publication Data
US 2015/0133601 A1    May 14, 2015

Related U.S. Application Data

(60) Provisional application No. 61/656,136, filed on Jun. 6, 2012.

(51) Int. Cl.
| | | |
|---|---|---|
| C08J 3/20 | (2006.01) |
| C08C 19/25 | (2006.01) |
| C08F 8/42 | (2006.01) |
| B60C 1/00 | (2006.01) |
| C08C 19/44 | (2006.01) |
| C08K 3/00 | (2006.01) |
| C08K 5/00 | (2006.01) |
| C08K 5/01 | (2006.01) |
| C08L 15/00 | (2006.01) |

(52) U.S. Cl.
CPC ............ *C08J 3/203* (2013.01); *B60C 1/0016* (2013.04); *B60C 1/0025* (2013.04); *C08C 19/25* (2013.01); *C08C 19/44* (2013.01); *C08F 8/42* (2013.01); *C08K 3/0033* (2013.01); *C08K 5/0008* (2013.01); *C08K 5/01* (2013.01); *C08J 2347/00* (2013.01); *C08L 15/00* (2013.01)

(58) Field of Classification Search
CPC .......... C08J 3/203; C08K 3/0033; C08K 5/01; C08K 5/0008
USPC .......................................... 524/575; 523/328
See application file for complete search history.

(56) References Cited

U.S. PATENT DOCUMENTS

| | | |
|---|---|---|
| 6,008,295 A | 12/1999 | Takeichi et al. |
| 6,255,404 B1 | 7/2001 | Hogan et al. |
| 6,369,167 B1 | 4/2002 | Morita et al. |
| 6,653,430 B1 | 11/2003 | Soga et al. |
| 7,342,070 B2 | 3/2008 | Tsukimawashi et al. |
| 2004/0254301 A1 | 12/2004 | Tsukimawashi et al. |
| 2009/0163668 A1 | 6/2009 | Yamada et al. |
| 2012/0108737 A1 | 5/2012 | Shibata et al. |

OTHER PUBLICATIONS

Kim, Dong Seok, International Search Report with Written Opinion from PCT/US2013/044408, 11 pp. (Aug. 23, 2013).

*Primary Examiner* — Edward Cain
(74) *Attorney, Agent, or Firm* — Meredith E. Hooker; Harry Gwinnell

(57) ABSTRACT

A method of making a polymer with stable Mooney viscosity is described. A conjugated diolefin is reacted in a hydrocarbon solvent in the presence of an initiator to form a polymer. After forming the polymer, alkoxysilane terminal functionalizing groups are bonded to the polymer. An alkoxysilane stabilizing agent is then added to the polymer in the presence of hydrocarbon oil. The polymer is then desolvatized, resulting in a polymer with stable Mooney viscosity, even over prolonged periods of time. Compositions and articles containing the polymer are also described.

14 Claims, 2 Drawing Sheets

US 9,611,364 B2

METHOD OF MAKING ALKOXYSILANE STABILIZED POLYMERS, AND POLYMER COMPOSITIONS

CROSS-REFERENCE TO RELATED APPLICATIONS

The present application may relate to subject matter disclosed in one or more of U.S. patent application Ser. No. 14/405,604 entitled "Method of Making Iminosilane Stabilized Polymers, Polymer Compositions, and Articles Containing Such Polymers", Ser. No. 14/560,651 entitled "Method of Making Silanol and Silanediol Stabilized Polymers, Polymer Compostions, and Articles Containing Such Polymers", and Ser. No. 14/406,624 entitled "Method of Making Polymers, Polymer Compositions, and Articles Containing Such Polymers". Each of the aforementioned applications is filed of even date herewith and assigned to an entity common hereto and shares an inventor common hereto. Further, the entirety of each and every one of the aforementioned applications is incorporated herein by reference for all purposes.

TECHNICAL FIELD

The field of art to which this invention generally pertains is conjugated diolefin polymers, methods of producing the same, and compositions and articles containing such polymers.

BACKGROUND

There is a constant search in the area of elastomeric polymers, such as styrene-butadiene rubbers, to control Mooney viscosity (hereinafter the use of Mooney viscosity will refer to conventional Mooney$_{ML1+4/100}$ viscosity measures unless otherwise indicated). Note, for example U.S. Pat. Nos. 5,659,056; 6,255,404; 6,393,167; 7,342,070; and published patent application No. 2009/0163668, the disclosures of which are incorporated by reference. Mooney viscosity creep with aging has become even more pronounced with the movement from batch to continuous polymerization. The addition of functional termination to the polymers to improve filler interaction, has also compounded the problem.

Advantageous properties have been imparted to polymers which are typically terminated using a number of different functional compounds, including silane containing compounds, to yield silane end-capped polymers. Note also, for example, U.S. Pat. Nos. 3,244,664 and 4,185,042, the disclosures of which are incorporated by reference. This alkoxysilane termination may also result in an increase in the Mooney viscosity of the treated polymer. However, upon the subsequent process of desolventization of the alkoxysilane terminated polymers through the use of either steam or heated water, an even larger increase in Mooney viscosity often occurs during the hydrolysis of the alkoxysilane end groups, thereby leading to coupling of the polymer via formation of Si—O—Si bonds between two end groups. Accordingly, many of the processes tried in the past do not actually prevent an increase in Mooney viscosity, but only slow the rate of the hydrolysis reaction and, therefore, the rate of coupling of the polymer. Over a period of time, for example during storage, the slow hydrolysis of the end groups will occur, thereby continuing the problem of increased Mooney viscosity and coupling of the alkoxysilane terminated polymers with aging.

Thus, while attempts have been made to reduce the rate of the hydrolysis reaction that results in the coupling of the alkoxysilane end groups of the polymers, the art has not provided a means or method by which to stabilize the polymer upon aging and essentially stop or slow down the coupling of the alkoxysilane terminated polymers over time.

BRIEF SUMMARY OF THE INVENTION

The present invention solves the above-mentioned problems through the use of methods for controlling the increase in Mooney viscosity of functionalized polymers, particularly during aging, e.g., storage over long periods of time. In embodiments, the present methods involve reacting a conjugated diolefin in a hydrocarbon solvent in the presence of an initiator to form a polymer. Alkoxy and/or aryloxy silane terminal functionalizing groups may then be bonded to the polymer. Alkoxysilane stabilizing agents may then be added to the polymer in the presence of hydrocarbon oil. The polymer is then typically desolvatized, resulting in a polymer with stable Mooney viscosity.

In embodiments, the desolvatizing is performed by drum drying, direct drying, or steam desolvatizing; the alkoxysilane stabilizing agent can have the formula:

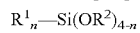

$$R^1{}_n—Si(OR^2)_{4-n}$$

wherein each $R^1$ is selected from the group consisting of $C_1$ to $C_{20}$ alkyl, $C_4$ to $C_{10}$ cycloalkyl, or $C_5$ to $C_{20}$ aromatic groups, wherein each $R^2$ may be the same as or different from $R^1$ or other $R^2$, if any, and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3.

In embodiments, the alkoxysilane stabilizing agent can be a dialkoxysilane; the alkoxysilane stabilizing agent can be a dimethoxysilane or a diethoxysilane; the alkoxysilane can be diphenyldimethoxysilane or diphenyldiethoxysilane; the initiator can be a butyl lithium; the hydrocarbon solvent can be one or more hexanes; the conjugated diolefin can be a 1,3-butadiene; the polymerizing step can include the presence of an aromatic vinyl compound; the aromatic vinyl compound can be a styrene; the hydrocarbon oil can be a black oil; and the hydrocarbon oil can be mineral oil.

In embodiments, the method can include drying the polymer after steam desolvatizing; the polymers produced according to methods of this invention; rubber compositions containing fillers and the polymers produced according to methods of this invention; and tires containing rubber compositions of this invention.

These and other objects, aspects, embodiments and features of the invention will become more fully apparent when read in conjunction with the following detailed description.

DETAILED DESCRIPTION OF THE INVENTION

Figure 1:
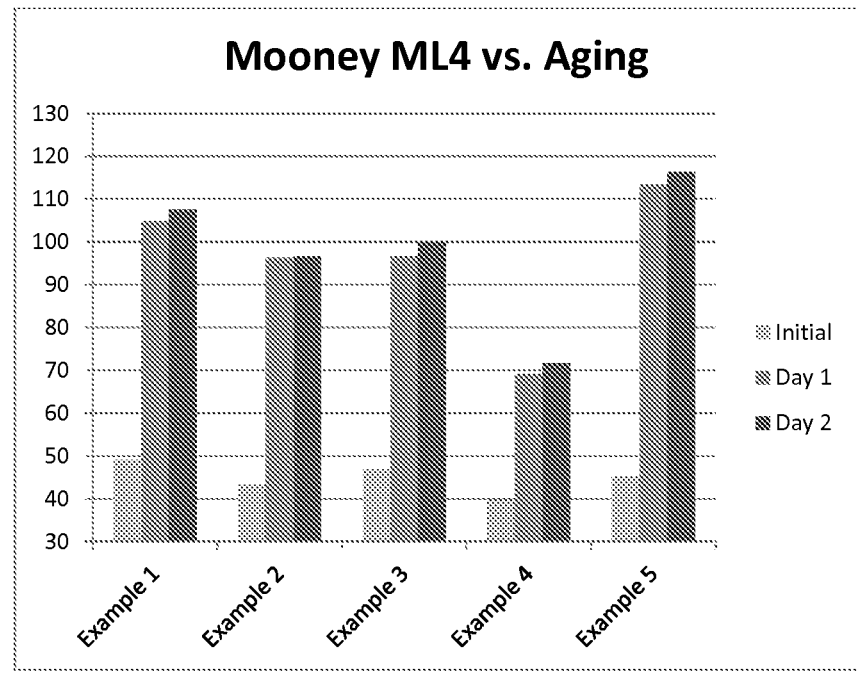
FIG. 1 shows Mooney viscosity and aging data for various samples.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments, with occasional reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Attempts to address Mooney viscosity deterioration in polymers are described, for example, in U.S. Pat. No. 5,659,056, which describes a process to treat the polymer prior to desolventization with a $C_1$ to $C_{12}$ aliphatic or $C_6$ to $C_{12}$ cycloaliphatic or aromatic carboxylic acid viscosity stabilizing agent soluble in the solvent used to prepare the polymer. U.S. Pat. No. 6,255,404 describes a method for stabilizing the Mooney viscosity of alkoxysilane terminated polymer having at least one hydrolyzable substituent on the end group with an alkyl trialkoxysilane viscosity stabilizing agent. U.S. Pat. No. 6,369,167 teaches improving polymer properties by reacting the terminal end groups of the polymer with a compound having alkylideneamino groups. U.S. Pat. No. 7,342,070 teaches improving polymer properties by bonding a primary amino group and an alkoxysilyl group to the polymer chain. And U.S. Pub. No. 2009/0163668 describes a method of improving polymer properties by reacting the active end groups of the polymer with a specific low molecular weight compound having a secondary amino group in which a hydrogen atom is substituted with a triorgano-substituted silyl group, an organic group having an N atom not adjacent to the N atom of the secondary amino group, and at least one alkoxysilyl group or a specific low molecular compound containing a heterocycle having a secondary amino group in which a hydrogen atom is substituted with a triorgano-substituted silyl group and at least one alkoxysilyl group. Alkoxysilane-terminated polymers are also well known in the art and have been prepared, for example, as described in U.S. Pat. No. 6,255,404 to Hogan, the disclosure of which is incorporated by reference. Issues still exist, however, with controlling Mooney viscosity, especially over time, for example, in long term storage.

The present invention not only produces polymers with acceptable Mooney viscosity levels as produced, but controls these values over time, including over long term storage. The process of the present invention is particularly applicable to any polymer having a functionalized end group having a hydrolyzable substituent which, when hydrolyzed, is subject to cross linking with other hydrolyzed groups. The hydrolyzable group is a pendant —SiOR group wherein R is an alkyl, cycloalkyl, or aromatic group capable of coupling with a like or similar pendant —SiOR group to form an Si—O—Si bond.

Polymers that can be stabilized in accordance with the process of the present invention can be any conjugated diolefins known in the art including polybutadiene, polyisoprene, and the like, and copolymers thereof with monovinyl aromatics such as styrene, alpha methyl styrene and the like, and trienes such as myrcene. Thus, the polymers include diene homopolymers and copolymers thereof with aromatic vinyl compounds. Exemplary diene homopolymers are those prepared from diolefin monomers having from about 4 to about 12 carbon atoms. Exemplary vinyl aromatic polymers are those prepared from monomers having from about 8 to about 20 carbon atoms.

Preferred polymers include diene homopolymers such as polybutadiene and polyisoprene and copolymers such as styrene butadiene rubber (SBR). Polymers and copolymers can comprise from 100 to about 20 percent by weight of diene units and from 0 to about 80 percent by weight of monovinyl aromatic hydrocarbon or triene units, totaling 100 percent. The copolymers may be random copolymers or block copolymers. Block copolymers include, but are not limited to, poly(styrene-butadiene-styrene), which are thermoplastic polymers. The polymers utilized and treated in accordance with the process of the present invention display utility in a number of applications, including, for example, use in the manufacture of tires.

The polymers employed in the practice of this invention can be prepared by employing any polymerization techniques. These techniques include, but are not limited to, cationic and anionic techniques, transition metal or coordination catalyst techniques, emulsion techniques, etc. Similarly, any organic alkali metals and/or the organic alkali earth metals may be used in the polymerization process of the present invention, including alkyllithiums such as n-butyllithium, sec-butyllithium and t-butyllithium, alkylenedilithiums such as 1,4-dilithiobutane, phenyllithium, stilbenelithium, lithiumnaphthalene, sodiumnaphthalene, potassiumnaphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, di-ethylaminobarium, and barium stearate. Polymerization of the polymers may be conducted in the presence of an organolithium anionic initiator catalyst composition. The organolithium initiator employed may be any anionic organolithium initiators useful in the polymerization of 1,3-diene monomers. In general, the organolithium compounds include hydrocarbon containing lithium compounds of the formula $R(Li)_x$ wherein R represents hydrocarbon groups containing from one to about 20 carbon atoms, and preferably from about 2 to about 8 carbon atoms, and x is an integer from 1 to 2. Although the hydrocarbon group is preferably an aliphatic group, the hydrocarbon group may also be cycloaliphatic or aromatic. The aliphatic groups may be primary, secondary, or tertiary groups although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octa-decyl. The aliphatic groups may contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organolithium compounds which are useful as anionic initiators in the polymerization of conjugated dienes in accordance with the process of the present invention include, but are not limited to, n-butyl lithium, s-butyl lithium, n-propyl lithium, isobutyl lithium, tertiary butyl lithium, amyl-lithium, and cyclohexyl lithium. Mixtures of different lithium initiator compounds also can be employed preferably containing one or more lithium compounds such as $R(Li)_x$, R and x as defined above. Other lithium catalysts which can be employed alone or in combination with the hydrocarbyl lithium initiators are tributyl tin lithium, lithium dialkyl amines, lithium dialkyl phosphines, lithium alkyl aryl phosphines and lithium diaryl phosphines. The preferred organolithium initiator is n-butyl lithium and in situ produced lithium hexamethylenimide initiator.

The amount of initiator required to effect the desired polymerization can be varied over a wide range depending upon a number of factors such as the desired polymer molecular weight, the desired 1,2- and 1,4-content of the conjugated diene, and the desired physical properties for the polymer produced. In general, the amount of initiator utilized may vary from as little as 0.2 millimole of lithium per 100 grams of monomers up to about 100 millimoles of lithium per 100 grams of monomers, depending upon the desired polymer molecular weight (typically 1,000 to 100,000,000 number average molecular weight).

The polymerizations of the present invention may be conducted in an inert solvent and would consequently be solution polymerizations. The term "inert solvent" means that the solvent does not enter into the structure of the resulting polymer, does not adversely affect the properties of the resulting polymer, and does not adversely affect the activity of the catalyst employed. Suitable inert solvents include hydrocarbon solvents which may contain aliphatic, aromatic or cycloaliphatic hydrocarbons such as hexane, pentane, toluene, benzene, cyclohexane and the like. Ethers such as tetrahydrofuran and tertiary amines such as triethylamine and tributylamine may also be used as solvents, but these will modify the polymerization as to styrene distribution, vinyl content and rate of reaction. The preferred solvents are aliphatic hydrocarbons and of these solvents, hexane is particularly preferred, including blends and mixtures of hexanes, e.g., linear and branched, including such things as cyclohexane alone or mixed with other forms of hexane.

Polymerization conditions such as temperature, pressure and time are well known in the art for polymerizing the monomers as described with the anionic initiator as described. For example, for illustrative purposes only, the temperature employed in the polymerization is generally not critical and may range from about −60° C. to about 150° C. Preferred polymerization temperatures may range from about 25° C. to about 130° C. for a polymerization time of a few minutes to up to 24 hours or more, and employing pressures generally sufficient to maintain polymerization admixtures substantially in the liquid phase, preferably at or near atmospheric pressure, depending on the temperature and other reaction parameters. Polymerization of any of the above-identified monomers in the presence of an organolithium initiator results in the formation of a "living" polymer. The lithium proceeds to move down the growing chain as polymerization continues. Throughout formation or propagation of the polymer, the polymeric structure may be anionic and living. In other words, a carbon anion is present. A new batch of monomer subsequently added to the reaction can add to the living ends of the existing chains and increase the degree of polymerization. A living polymer, therefore, may include a polymeric segment having an anionic reactive end. Reference to anionically polymerized polymers or anionically polymerized living polymers refers to those polymers prepared by anionic polymerization techniques.

In order to promote randomization in copolymerization and to control vinyl content, one or more modifiers may optionally be added to the polymerization ingredients. Amounts range from 0 to about 90 or more equivalents per equivalent of lithium. Compounds useful as modifiers are typically organic and include those having an oxygen or nitrogen hetero-atom and a non-bonded pair of electrons. Examples include dialkyl ethers of mono and oligo alkylene glycols; "crown" ethers; tertiary amines such as tetramethyethylene diamine (TMEDA); tetrahydrofuran (THF), THF oligomers, linear and cyclic oligomeric oxolanyl alkanes and the like. Particular examples of these modifiers include potassium t-amylate and 2,2'-di(tetrahydrofuryl) propane. These modifiers are further described in U.S. Pat. No. 4,429,091, the disclosure of which in incorporated by reference.

Polymerization is begun by charging a blend of the monomer(s) and solvent to a suitable reaction vessel, followed by the addition of the modifier(s) and the initiator solution previously described. The procedure is carried out under anhydrous, anaerobic conditions. The reactants may be heated to a temperature of from about 23° C. to about 120° C., and are typically agitated for about 0.15 to about 24 hours. After polymerization is complete, the product may be removed from the heat and terminated with a functional end group as is conventionally done in the art, although termination could also be done without removal of heat. Prior to terminating the polymerization reaction with a functional end group, a coupling agent may be added to the polymerization reaction to increase the Mooney viscosity to a desired range. Tin coupling agents such as tin tetrachloride (SnCl$_4$) are well known in the art and may be added in varying amounts, typically in amounts of 0 to about 0.9 mole equivalent functionality per each mole equivalent of anionic initiator depending upon the desired Mooney viscosity of the polymer.

The functional terminated polymers described above may include any polymer having a terminal end group in which the end group contains one or more hydrolyzable pendant substituents.

Exemplary alkoxy terminal functionalizing groups bonded to polymers are siloxane terminated polymers represented by the following formula:

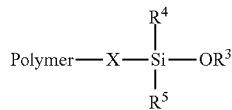

wherein X may be present or not present and represents a linking atom, chemical bond, or a linking group such as oxygen or sulfur, and wherein $R^3$ is a $C_1$ to $C_{18}$ alkyl, $C_1$ to $C_{18}$ alkyl containing a heteroatom such as nitrogen or oxygen, $C_4$ to $C_8$ cycloalkyl, or $C_6$ to $C_{18}$ aromatic group, and $R^4$ and $R^5$ may be the same or different and are selected from the group consisting of —$OR^3$, a $C_1$ to $C_{18}$ alkyl, $C_4$ to $C_8$ cycloalkyl, or $C_6$ to $C_{18}$ aromatic group. A preferred functionalizing agent would be 3-(1,3,-dimethylbutylidene) aminopropyltriethoxysilane (DMBAPTS), represented in the above formula by $R^3$ being $C_2$, forming an ethoxy group, $R^4$ being the same group as $OR^3$, and $R^5$ being a 3-(1,3-dimethylbutylidene)aminopropyl group. In addition to the formula representation shown above, additional polymer chains could also be bonded through the $R^4$ and/or the $R^3$ positions as well.

The process of the present invention, prior to quenching, drying or removing the solvent, e.g., by drum drying (DD), with steam, or heated water, or direct drying (e.g., List AG technology), and optionally further drying the polymer, adds hydrocarbon oil and an alkoxysilane viscosity stabilizing agent to the polymer, namely an alkoxysilane having the structural formula:

$$R^1{}_n\text{—Si}(OR^2)_{4-n}$$

wherein each $R^1$ is selected from the group consisting of $C_1$ to $C_{20}$ alkyl, $C_4$ to $C_{10}$ cycloalkyl, or $C_5$ to $C_{20}$ aromatic groups, wherein each $R^2$ may be the same as or different from $R^1$ or other $R^2$, if any, and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3. Particularly preferred as viscosity stabilizing agents are those low molecular weight alkyl alkoxysilanes selected from the group consisting of diaryl dialkoxysilanes, i.e., those alkyl alkoxysilanes where n=2 in the structural formula set forth hereinabove, for example, diphenydiethoxysilane or diphenyldimethoxysilane (DPDMS).

The viscosity stabilizing agents of the present invention can be employed in varying amounts and the amount employed is particularly dependent upon the type of alkoxysilane employed since reaction with the siloxane terminated polymers is dependent upon the molar ratio of the added alkoxysilane to the siloxane terminated polymer. For example, where a trialkyl alkoxysilane (n=3) is used, a significant amount of the agent will be necessary to provide a ratio which will supply a sufficiently high molar ratio of stabilizing agent to siloxane-terminated polymer. Nevertheless, for the alkoxysilanes, preferred amounts may range from about 0.5 to about 50 mole equivalents per mole equivalent of anionic initiator, and more preferably, a range of from about 1 mole to about 20 mole equivalents per mole equivalent of anionic initiator is desired, with 2 to 8 mole equivalents most typically used.

The viscosity stabilizing agents of the present invention react with the functional end groups of the polymer. However, because the Si—O—Si bonds being produced are between the polymer and the alkoxysilane additive, as shown below, and not between the polymers themselves, there is no significant increase in Mooney viscosity.

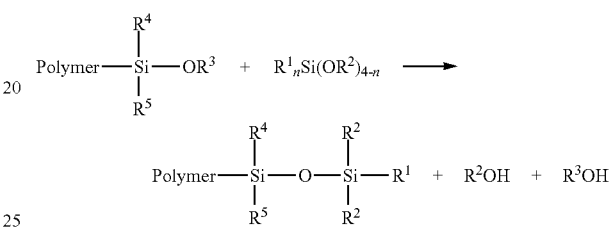

Hydrocarbon oils such as aromatic or naphthenic oils can be used. The oil used is not particularly limited, and in fact any hydrocarbon oils such as those typically used with diene-based polymers can be used. A mineral based oil is preferably used. In general, commercially available mineral oils are mixtures of aromatic oils, alicyclic oils and aliphatic oils, and classified into the aromatic family, alicyclic family (naphthenic family) and aliphatic family (paraffinic family) according to the amount and ratio thereof. Any of them can be used in the present invention. However, black oil is particularly preferred. Black oil is a relatively inexpensive, low-grade, black petroleum oil. It is typically described as liquid crude oil or heavy fuel oil. It is commercially available and can be purchased from Ergon under the brand name HYPRENE BO300, for example.

In addition to the viscosity stabilizing agent, an antioxidant such as 2,6-di-t-butyl-4-methylphenol or butylated hydoxy toluene (BHT) may be added in solvent (hexane) solution, as is well known in the art. The antioxidant reduces the likelihood that Mooney viscosity instability is due to oxidative coupling.

Optionally, upon termination, the functional terminated polymer could be quenched, if necessary, and dried. Quenching may be conducted by contacting the siloxane terminated polymer with a quenching agent for about 0.05 to about 2 hours at temperatures of from about 30° C. to about 120° C. to insure complete reaction. Suitable well known quenching agents include alcohol, water, carboxylic acids such 2-ethyl hexanoic acid (EHA), acetic acid and the like. Alternative to, or in combination with, the step of quenching, the alkoxysilane terminated polymer may be drum dried as is well known in the art. The use of steam or high heat to remove solvent is also well known in the art.

The functionalizing agent may be present in a molar ratio (to initiator) of about 0.25 to 2, and preferably about 0.5 to 1. The stabilizing agent may be present in a moles of Si to moles of initiator ratio of 0.5 to 30, more typically 1 to 20, preferably 2 to 15, and most preferred 3 to 10. The hydrocarbon oil is typically present in an amount of up to 40 parts per hundred (phr) parts polymer, and preferably 1 to 20 phr.

While polymers according to the present invention may be produced with Mooney viscosity of less than 150, Mooney viscosity less than 120 is preferred, and Mooney viscosity less than 100 more preferred. Ideally, Mooney viscosity of 40 to 80 is the most preferred target range. Control of increase in Mooney viscosity over time is also one of the real advantages of the present invention. By stable Mooney viscosity is meant that the changes in Mooney viscosity are small. For example, changes in Mooney viscosity (increases) of less than 20 over a storage period of up to two years is preferred.

While not being bound by any particular theory, it is believed that the oils compatibilize the alkoxysilanes and help them to be retained through the finishing process, therefore making them more available for the type of reaction referred to above. It should be noted that the stabilizing agents are soluble in the hydrocarbon solvents as well as in the oil. It is also believed that the oil allows the stabilizing agent to better mix and get in close proximity to the functionalized polymer. It is believed that the oil accelerates the stabilizing agent reaction, further restricting polymer growth, i.e., the stabilizing agent will either react with the functionalized polymer or find another available functionalized polymer to react with, since the hydrolysis reaction between polymer chains is a slower reaction than the stabilizing reaction. The presence of the oil is believed to keep everything in close proximity, being miscible with the polymer, preferentially reacting with the smaller molecules, i.e., the methoxy groups turn into hydroxyl groups, reacting with small molecules rather than with another large polymer group. The presence of the oil appears to dramatically slow down the hydrolysis reaction between polymer chains, without having the same effect on the smaller molecule reactions. The presence of the oil also allows the use of less expensive stabilizing systems, as opposed to more expensive materials, like n-octyltriethoxysilane (OTES), for example. While the inclusion of the oil is particularly useful in continuous processing, it does provide Mooney stability advantage in batch and semi-batch processes as well.

The invention is further illustrated by reference to the following examples. It will be apparent to those skilled in the art that many modifications, both to the materials and methods, may be practiced without departing from the purpose and scope of the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

Examples 1-5 shown in Table 1 are from a continuous polymerization run using two stirred 20 gallon (76 liter) reactors with 105 pounds (47.6 kilograms) of hexane capacity at 70° F. (21° C.). The flow was added continuously at 20 weight % total monomer concentration in hexanes, 37 weight % of monomer consisting of styrene, 63 weight % of monomer consisting of butadiene, with a total flow rate of 315 pounds/hour (142.9 kilograms/hour), resulting in 20 minute residence time. The initiator (500 grams/hour of 3 weight % n-Butyllithium) was added at the bottom of the reactor, with 0.33 molar ratio of 1,2-butadiene/butyllithium, and 0.37 molar ratio of 2,2'-di(tetrahydrofuryl) propane to butyllithium. The first reactor ⅔ temperature (temperature measurement on the side of the reactor approximately at the ⅔ volume point from the bottom) was controlled to 224° F. (107° C.). After the first 20 (76 liter) gallon reactor, 0.5 molar ratio of DMBAPTS to bultyllithium was added, and continuously mixed in the second 20 (76 liter) gallon reactor. The polymer samples were collected in a blend tank for 2 hours, then 0.5 molar ratio of DPDMS (diphenydimethoxysilane) was added to the blend tank as a stabilizer, followed by BHT and isopropanol. Two drums of polymer were extracted for further work. One drum was split into six 5 gallon (19 liter) samples with 18 pounds (8.2 kilograms) of polymer cement each. The samples were then treated as shown in Table 1 showing the total amount of DPDMS added. Numbers are molar ratio of added material, e.g., stabilizer, to initiator (in this case the BuLi), and phr is parts per hundred parts polymer.

As is well known in the art, polymer cement refers to polymer solutions, including polymer dissolved in a solvent, polymer suspended in a solvent, or a combination thereof. The resultant polymer samples were steam desolventized at 180° F. (82.2° C.), then dried in an air oven at 70° C. for 4 hours. The dried samples were aged at 100° C. ambient air humidity for 2 days. Mooney viscosity (at 100° C.) was measured at 1 and 2 days. The results of the Mooney viscosity tests and other testing are shown in the tables and graphs included below. The accelerated polymer aging data is meant to simulate longer term storage, using a set temperature over a set period of time. In the examples, unless otherwise stated, 100° C. was used, over a period of 48 hours, in an ambient air oven.

TABLE 1

| Sample | Additive | Initial | Day 1 | Day 2 |
|---|---|---|---|---|
| Example 1 | 1.5 DPDMS/BuLi | 49.1 | 104.9 | 107.5 |
| Example 2 | 2.5 DPDM/BuLi | 43.3 | 96.3 | 96.6 |
| Example 3 | 0.5 DPDMS/BuLi plus 5 phr Black Oil | 46.8 | 96.6 | 99.9 |
| Example 4 | 2.5 DPDMS/BuLi plus 5 phr Black Oil | 39.7 | 69.1 | 71.7 |
| Example 5 | 0.5 DPDMS/BuLi, No additional treatment | 45.2 | 113.3 | 116.4 |

Referring to Table 1 and FIG. 1, the results of 2 days of aging at 100° C. show that only the combination of DPDMS with black oil had a significant reduction in the aged Mooney viscosity.

Referring to Table 2, after this result, the study was tested further with polymer samples which were polymerized under the same conditions as the examples in Table 1 except with a polymerization temperature of at 221° F. (105° C.). These examples were collected and terminated with isopropanol and 1 phr BHT for antioxidant. No stabilizer was added to the blend tank for examples 6-7. Then, a drum was taken from the blend tank and split into three 5 gallon (19 liter) samples and treated as follows.

TABLE 2

| Example | Additive | Initial | Day 1 | Day 2 |
|---|---|---|---|---|
| Example 6 | 7 OTES/BuLi | 53.6 | | 98.7 |
| Example 7 | Nothing | 72.7 | 115.3 | 111.5 |
| Example 8 | 4 DPDMS/BuLi + 5 phr black oil | 50.5 | 74.8 | 76.1 |

Figure 2:
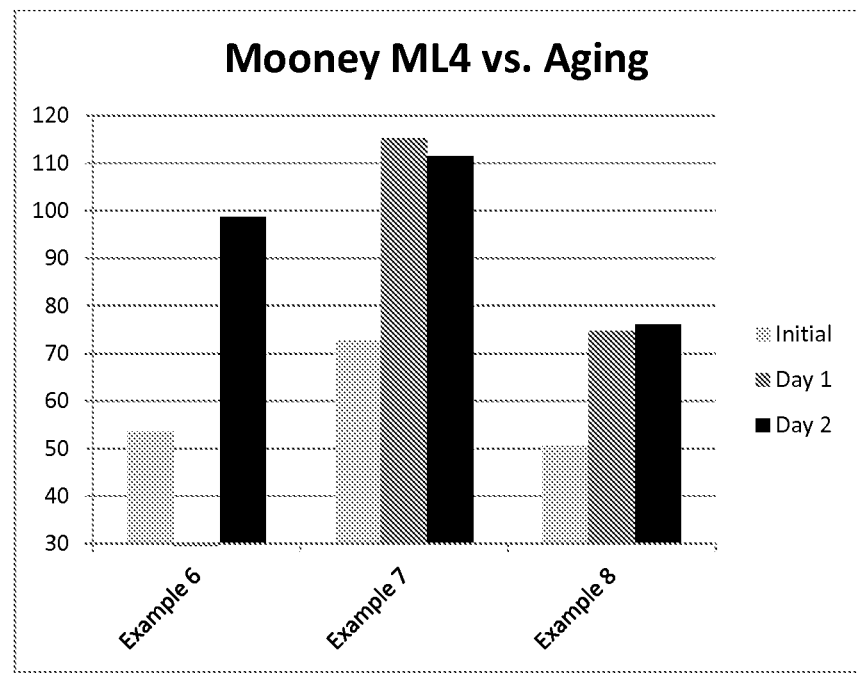
FIG. 2 shows Mooney viscosity and aging data for various samples.

The data in Tables 2, as also shown in the graph in FIG. 2, show the Aged Mooney viscosity versus the Examples. This clearly shows that no additive results in very high Mooney viscosity after aging. The DPDMS with black oil clearly works well in controlling Mooney viscosity growth.

Examples 9-11 shown in Table 3 are from a continuous polymerization run using two stirred 20 (76 liter) gallon reactors with 105 pounds of hexane capacity at 70° F. (21° C.). The flow was added continuously at 20% total monomer concentration in hexanes, 30% of monomer consisting of styrene, 70 of monomer consisting of butadiene, with a total flow rate of 315 pounds/hour (142.9 kilograms/hour), resulting in 20 minute residence time. The initiator (500 grams/hour of 3 weight % n-butyllithium) was added at the bottom of the reactor, with 0.37 molar ratio of 1,2-butadiene/butyllithium, and 0.42 molar ratio of 2,2'-di(tetrahydrofuryl) propane/butyllithium. The first reactor ⅔ temperature was controlled to 236° F. After the first 20 gallon (76 liter) reactor, 0.57 molar ratio of (DMBAPTES) to bultyllithium was added, and continuously mixed in the second 20 gallon reactor. The polymer samples were collected in a blend tank for 2 hours, then isopropanol was added to quench the active lithium and 1 phr BHT added for antioxidant. Two drums of polymer were extracted for further work. One drum was split into three 5 gallon samples with 18 pounds of polymer cement each. The samples were then treated as shown in Table 3.

TABLE 3

| Example | Additive | Initial | Day 1 | Day 2 |
| --- | --- | --- | --- | --- |
| Example 9 | 2 DPDMS/BuLi plus 5 phr Black Oil | 70 | 98.2 | 95.6 |
| Example 10 | 4 DPDMS/BuLi plus 5 phr Black Oil | 57.8 | 77.9 | 80 |
| Example 11 | 4 DPDMS/BuLi | 71.7 | 126.1 | 121.1 |

Figure 3:
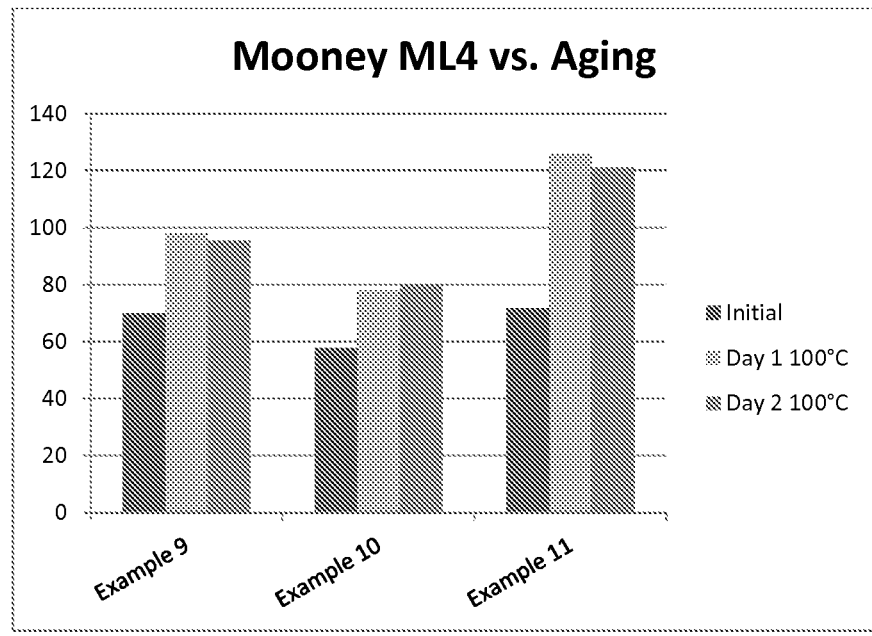
FIG. 3 shows Mooney viscosity and aging data for various samples.

Referring to Table 3 and the graphs shown in FIG. 3, this study shows that DPDMS with Black Oil is effective in reducing oven aged Mooney viscosity. It should be noted that the DPDMS alone did not reduce the aged Mooney viscosity in this case.

Examples 12-14 shown in Table 4 are from a continuous polymerization run using two stirred 20 gallon (76 liter) reactors with 105 pounds of hexane capacity at 70° F. (21° C.). The flow was added continuously at 20 weight % total monomer concentration in hexanes, 37 weight % of monomer consisting of styrene, 63 weight % of monomer consisting of butadiene, with a total flow rate of 315 pounds/hour (142.9 kilograms/hour), resulting in 20 minute residence time. The initiator (500 grams/hour of 3 weight % n-Butyllithium) was added at the bottom of the reactor, with 0.34 molar ratio of 1,2-Butadiene/butyllithium, and 0.34 molar ratio of 2,2'-di(tetrahydrofuryl) propane to butyllithium. The first reactor ⅔ temperature was controlled to 218° F. (103° C.). After the first 20 gallon (76 liter) reactor, 0.52 molar ratio of DMBAPTS to bultyllithium was added, and continuously mixed in the second 20 gallon (76 liter) reactor. The polymer samples were collected in a blend tank for 2 hours, then isopropanol and BHT was added. Two drums of polymer were extracted for further work. One drum was split into three 5 gallon (19 liter) samples with 18 pounds (8.2 kilograms) of polymer cement each. The samples were then treated as shown in Table 1 showing the total amount of DPDMS or OTES added. Additive numbers are molar ratios, and phr parts per hundred parts polymer.

Figure 4:
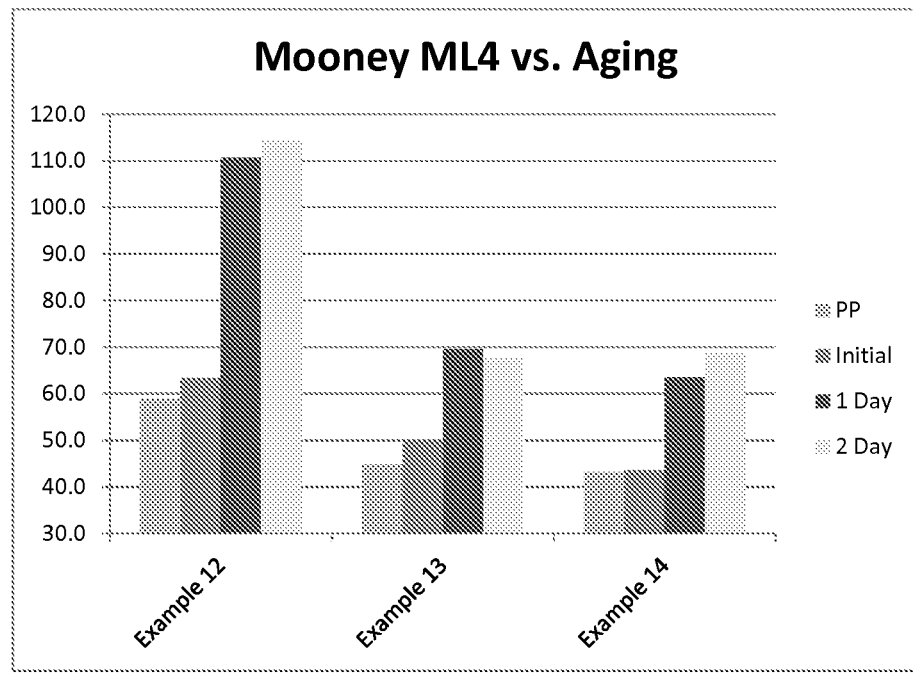
FIG. 4 shows Mooney and aging data for various samples.

The graphs shown in FIG. 4 and Table 4 show that other oils, such as mineral oil (e.g., such as Sigma-Aldrich catalog number 330760 Mineral Oil, white, heavy), work just as well as black oil, indicating that the important character of the black oil is not its impurities (e.g., that would not be present in mineral oil). While not being bound by any particular theory, based on this data, it is possible that the physical properties of the hydrocarbon oil would either limit the hydrolysis rate of the DPDMS, compatabilize the DPDMS with the polymer matrix, or reduce the losses of the DPDMS into the water or vapor phase during the steam desolventization process.

TABLE 4

| Sample | Additive | Initial | 1 Day | 2 Day |
| --- | --- | --- | --- | --- |
| Example 12 | 7 OTES/BuLi | 63.4 | 110.6 | 114.3 |
| Example 13 | 4 DPDMS/BuLi plus 5 phr Black Oil | 49.7 | 69.6 | 67.7 |
| Example 14 | 4 DPDMS/BuLi plus 5 phr Mineral Oil | 43.6 | 63.6 | 68.6 |

The invention is particularly suited for alkoxysilane terminated polymers, but is not necessarily limited thereto. The moisture stabilized polymers and method of the present invention can be used separately with other equipment, methods and the like, to produce various polymeric materials or compounds suitable for use in the production of various articles including pneumatic tires and the like, especially in the tread and sidewall portions of the tires. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a polymer comprising,
   reacting a conjugated diolefin in a hydrocarbon solvent in the presence of an initiator to form a polymer,
   bonding alkoxy and/or aryloxy silane terminal functionalizing groups to the polymer,
   adding an alkoxysilane stabilizing agent to the polymer in the presence of hydrocarbon oil,
   and desolvatizing the polymer,
   resulting in a polymer with stable Mooney viscosity.

2. The method of claim 1, wherein the desolvatizing is performed by drum drying, direct drying, or steam desolvatizing.

3. The method of claim 1, where in the alkoxy silane stabilizing agent has the formula:

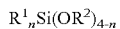

$R^1{}_n Si(OR^2)_{4-n}$ wherein each $R^1$ is selected from the group consisting of $C_1$ to $C_{20}$ alkyl, $C_4$ to $C_{10}$ cycloalkyl, or $C_5$ to $C_{20}$ aromatic groups, wherein each $R^2$ may be the same as or different from $R^1$ or other $R^2$, if any, and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3.

4. The method of claim 3, wherein the alkoxysilane stabilizing agent is a dialkoxy silane.

5. The method of claim 3, wherein the alkoxysilane stabilizing agent is diethoxy silane or a dimethoxy silane.

6. The method of claim 3, wherein the alkoxysilane stabilizing agent is diphenyldimethoxysilane or a diphenydiethoxysilane.

7. The method of claim 1, wherein the initiator is butyl lithium.

8. The method of claim 1, wherein the hydrocarbon solvent is one or more hexanes.

9. The method of claim 1, wherein the conjugated diolefin is 1,3-butadiene.

10. The method of claim 1, wherein the polymerizing step includes the presence of an aromatic vinyl compound.

11. The method of claim 10, wherein the aromatic vinyl compound is styrene.

12. The method of claim 1, wherein the hydrocarbon oil is black oil.

13. The method of claim 1, wherein the hydrocarbon oil is mineral oil.

14. The method of claim 1 including drying the polymer after steam desolvatizing.

* * * * *